US011922903B2

(12) United States Patent
Yamada

(10) Patent No.: US 11,922,903 B2
(45) Date of Patent: Mar. 5, 2024

(54) IMAGE DISPLAY METHOD, IMAGE DISPLAY DEVICE, AND NON-TRANSITORY COMPUTER-READABLE STORAGE FOR CHANGING DISPLAY OF AN ADDITIONAL IMAGE ADDED TO AN IMAGE

(71) Applicant: Seiko Epson Corporation, Tokyo (JP)

(72) Inventor: Yusuke Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/387,698

(22) Filed: Jul. 28, 2021

(65) Prior Publication Data

US 2022/0036861 A1 Feb. 3, 2022

(30) Foreign Application Priority Data

Jul. 31, 2020 (JP) ................................ 2020-130905

(51) Int. Cl.

*G09G 5/37* (2006.01)
*G09G 5/14* (2006.01)
*G09G 5/34* (2006.01)

(52) U.S. Cl.

CPC ................. *G09G 5/37* (2013.01); *G09G 5/14* (2013.01); *G09G 5/34* (2013.01); *G09G 2354/00* (2013.01)

(58) Field of Classification Search

None

See application file for complete search history.

(56) References Cited

U.S. PATENT DOCUMENTS

| | | | | |
|---|---|---|---|---|
| 9,767,080 | B2 | 9/2017 | Imamura | |
| 2008/0123123 | A1* | 5/2008 | Kawaharada | H04N 1/32561 358/1.12 |
| 2008/0291474 | A1 | 11/2008 | Hoshino et al. | |
| 2010/0280747 | A1* | 11/2010 | Achthoven | G01C 21/3638 715/768 |
| 2012/0206498 | A1 | 8/2012 | Kai et al. | |
| 2012/0221943 | A1* | 8/2012 | Yamada | G06F 9/451 715/243 |
| 2012/0287165 | A1 | 11/2012 | Yamada | |
| 2013/0314453 | A1* | 11/2013 | Ko | G06F 3/04817 345/102 |
| 2014/0053066 | A1 | 2/2014 | Imamura | |
| 2015/0370756 | A1* | 12/2015 | Steeb, III | G06F 3/0485 715/201 |
| 2016/0086571 | A1* | 3/2016 | Aoki | G06F 3/04847 345/593 |

(Continued)

FOREIGN PATENT DOCUMENTS

| | | |
|---|---|---|
| JP | 2008-293496 | 12/2008 |
| JP | 2011-028311 | 2/2011 |

(Continued)

*Primary Examiner* — Patrick F Valdez

(74) *Attorney, Agent, or Firm* — WORKMAN NYDEGGER

(57) ABSTRACT

An image display method includes displaying a first image and a second image on a display and, when the first image to which a first additional image identifying the first image is added and the second image to which a second additional image identifying the second image is added are displayed on the display along a first axis in a still state, making a display mode different between the first additional image added to the first image and the second additional image added to the second image.

16 Claims, 5 Drawing Sheets

(56) References Cited

U.S. PATENT DOCUMENTS

| | | | | |
|---|---|---|---|---|
| 2016/0092083 | A1* | 3/2016 | Korkus | G06F 3/04817 715/765 |
| 2020/0064983 | A1* | 2/2020 | Higuchi | G06F 16/00 |
| 2022/0050295 | A1* | 2/2022 | Russell | G02B 27/283 |

FOREIGN PATENT DOCUMENTS

| | | | | |
|---|---|---|---|---|
| JP | 2011-221586 | | | 11/2011 |
| JP | 2012-178002 | A | | 9/2012 |
| JP | 2012-230570 | A | | 11/2012 |
| JP | 2012-238223 | | | 12/2012 |
| JP | 2013-235618 | | | 11/2013 |
| JP | 2017-142711 | | | 8/2017 |
| JP | 2017142711 | A | * | 8/2017 |

* cited by examiner

IMAGE DISPLAY METHOD, IMAGE DISPLAY DEVICE, AND NON-TRANSITORY COMPUTER-READABLE STORAGE FOR CHANGING DISPLAY OF AN ADDITIONAL IMAGE ADDED TO AN IMAGE

The present application is based on, and claims priority from JP Application Serial Number 2020-130905, filed Jul. 31, 2020, the disclosure of which is hereby incorporated by reference herein in its entirety.

BACKGROUND

1. Technical Field

The present disclosure relates to an image display method, an image display device, and a non-transitory computer-readable storage medium storing a display control program.

2. Related Art

Plural images are displayed on a screen of a mobile terminal device or the like.

With a display program and the like described in JP-A-2013-235618, when a scroll operation is received while a plurality of images are displayed, identifiers are displayed while being overlapped on the images during the scroll processing (see JP-A-2013-235618).

With a printing setting device and the like described in JP-A-2008-293496, a plurality of images are displayed with page numbers displayed above the respective images (see JP-A-2013-235618).

With a display having a small display area used for a tablet terminal device and the like, when identifiers such as page numbers are added to all of a plurality of images displayed, the visibility of the images is compromised. As a method for avoiding this, there is a method of adding identifiers to images under scroll processing. Still, this method does not contribute to improvement in the identifiability of the images not under the scroll processing.

SUMMARY

According to an aspect, an image display method includes displaying a first image and a second image on a display unit and, when the first image to which a first additional image identifying the first image is added and the second image to which a second additional image identifying the second image is added are displayed along a first axis in a still state, making a display mode different between the first additional image added to the first image and the second additional image added to the second image.

According to an aspect, an image display device includes: a display unit displaying a first image and a second image; an input unit receiving an input; and a display control unit, when the first image to which a first additional image identifying the first image is added and the second image to which a second additional image identifying the second image is added are displayed along a first axis in a still state, making a display mode different between the first additional image added to the first image and the second additional image added to the second image.

According to an aspect, a non-transitory computer-readable storage medium stores a display control program executed by a computer causing a display unit to display a first image and a second image, the display control program including causing the computer to: when the first image to which a first additional image identifying the first image is added and the second image to which a second additional image identifying the second image is added are displayed along a first axis in a still state, make a display mode different between the first additional image added to the first image and the second additional image added to the second image.

DESCRIPTION OF EXEMPLARY EMBODIMENTS

Hereinafter, embodiments will be described with reference to the drawings.

Figure 1:
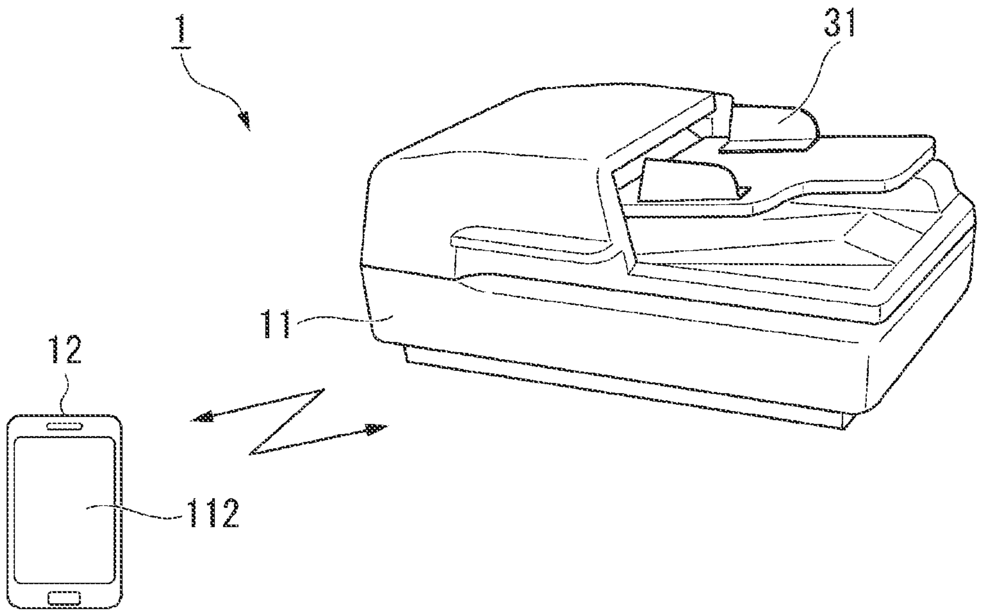
FIG. 1 is a diagram illustrating a schematic configuration example of an information processing system.

FIG. 1 is a diagram illustrating a schematic configuration example of an information processing system 1 according to an embodiment.

The information processing system 1 includes an image processing apparatus 11 and a mobile terminal device 12. The image processing apparatus 11 and the terminal device 12 wirelessly communicate with each other.

The terminal device 12 is a tablet terminal device, a smartphone, or the like, and is a portable device that can be carried around by a user.

The terminal device 12 includes a display unit 112 that is a touch screen having a touch input function. The display unit 112 is a display. The terminal device 12 is operated by a user and displays various types of information on the display unit 112.

The terminal device 12 communicates with the image processing apparatus 11 and controls image processing executed by the image processing apparatus 11.

The image processing apparatus 11 is controlled based on an instruction or the like received from the terminal device 12, and executes image processing according to the content of the control.

The image processing apparatus 11 has a scanner function. The image processing apparatus 11 reads a plurality of images using the scanner function and wirelessly transmits data on the plurality of images thus read to the terminal device 12. The image processing apparatus 11 includes an auto document feeder 31, automatically transports sheets of paper placed on the auto document feeder 31, and reads images on the respective sheets of paper. The sheets of paper are of a size such as A4 or A3. The sheets of paper may be of any number, and may be 100 sheets of paper or the like.

The terminal device 12 displays a plurality of images on the display unit 112 based on the data on the plurality of images received from the image processing apparatus 11.

The terminal device 12 receives an instruction corresponding to an operation performed by the user for an image displayed on the display unit 112, and executes processing according to the instruction received.

The user can check the list of images, edit the images being processed by the image processing apparatus 11, or perform the other like processes, while viewing the images displayed on the display unit 112 of the terminal device 12.

Figure 2:
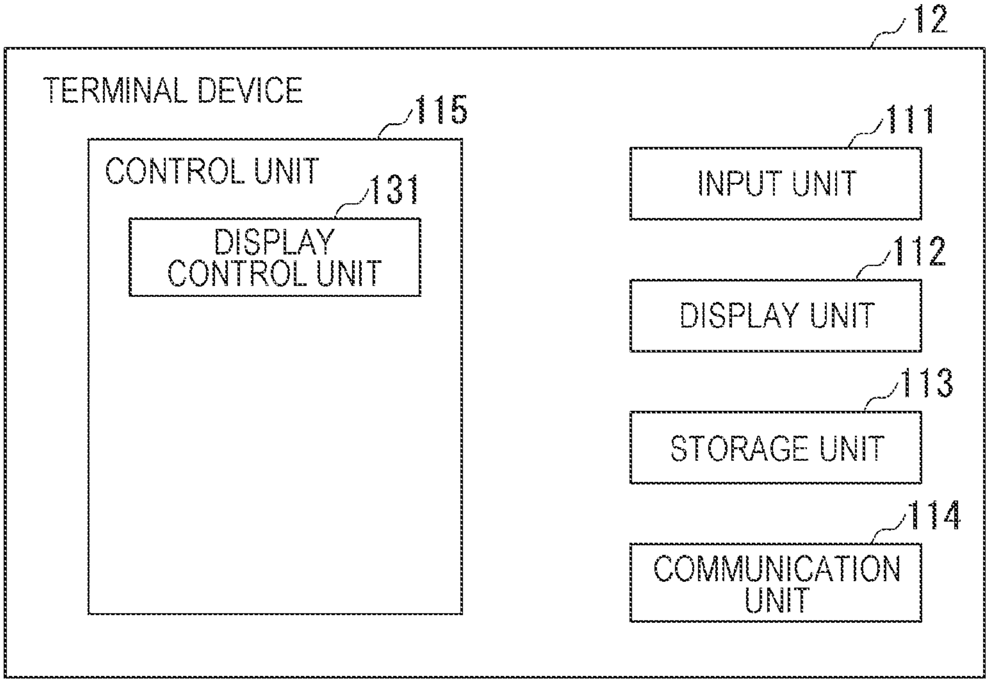
FIG. 2 is a diagram illustrating a configuration example of functional blocks of a terminal device.

FIG. 2 is a diagram illustrating a configuration example of functional blocks of the terminal device 12 according to the embodiment.

The terminal device 12 includes an input unit 111, the display unit 112, a storage unit 113, a communication unit 114, and a control unit 115.

The control unit 115 includes a display control unit 131.

The input unit 111 and the display unit 112 include a screen having a touch input function.

The input unit 111 inputs the content of a touch operation performed by the user on the screen. The input unit 111 detects contact and movement of a user's finger or a touch pen, and receives the content of the touch operation according to the result of the detection.

The display unit 112 displays various types of information on the screen.

The storage unit 113 stores various types of information. The information includes data such as an original image to be displayed and a related image generated based on the original image.

The storage unit 113 is a memory including a read only memory (ROM), a random-access memory (RAM), and the like.

The communication unit 114 wirelessly communicates with the image processing apparatus 11.

The communication unit 114 may be referred to as a communication circuit, a communication port, or a communication interface.

The control unit 115 performs various types of processing and control. The control unit 115 is a controller including a central processing unit (CPU).

The control unit 115 includes the display control unit 131.

The display control unit 131 controls processing for displaying various types of information on the display unit 112.

The CPU of the control unit 115 executes a control program stored in the storage unit 113 and performs various types of processing and control.

The control program includes a display control program for display control. The function of the display control unit 131 is realized by the CPU of the control unit 115 executing the display control program stored in the storage unit 113.

The display control program may be a program of an application dedicated to the image processing apparatus 11. The terminal device 12 may store the display control program in the storage unit 113 in advance, or may download and install the display control program.

Here, the terminal device 12 is configured to have the display control unit 131 included in the control unit 115, but the function of the display control unit 131 that performs the display control may be configured as a dedicated functional unit separately from the control unit 115.

The display control performed by the terminal device 12 will be described below.

The communication unit 114 receives data on a plurality of images from the image processing apparatus 11.

The display control unit 131 acquires the data on a plurality of images transmitted from the image processing apparatus 11. Each of the plurality of images is assumed to be an original image in the description.

The plurality of images are associated with page numbers, which are serial numbers, according to the arrangement order. The page numbers may be added by the terminal device 12, or may be added by the image processing apparatus 11.

The display control unit 131 sets a three-dimensional coordinate system for each of the plurality of images. Such a three-dimensional coordinate system is referred to as a local coordinate system in the description. The local coordinate system is a three-dimensional Cartesian coordinate system.

Figure 3:
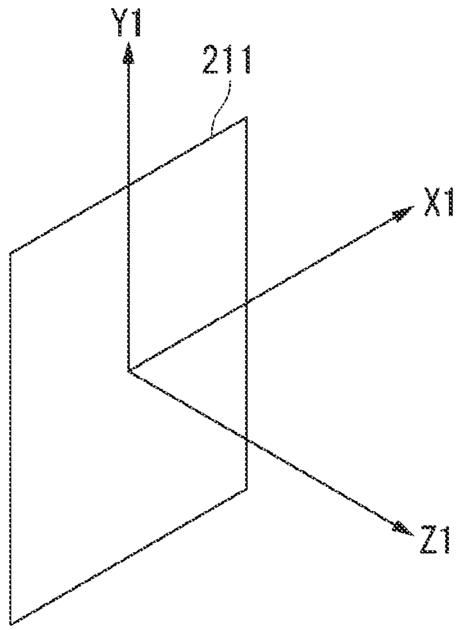
FIG. 3 is a diagram illustrating an example of a local coordinate system for one image.

FIG. 3 is a diagram illustrating an example of a local coordinate system for an image 211 according to the embodiment.

A local coordinate system including an X1 axis, a Y1 axis, and a Z1 axis is set for the image 211.

The local coordinate system is set for each of the plurality of images.

The local coordinate system may be in any arrangement with respect to each of the images.

The display control unit 131 adjusts the arrangement of each of the plurality of images, with reference to the respective local coordinate systems.

The display control unit 131 arranges the plurality of images in a three-dimensional coordinate system common to the plurality of images. Such a common three-dimensional coordinate system is referred to as a global coordinate system in the description. The global coordinate system is a three-dimensional Cartesian coordinate system.

The display control unit 131 maps the entire image, in which the plurality of images are arranged in the global coordinate system, onto a two-dimensional coordinate system, to obtain display data as the mapping result. The display data is pixel data. Each image in the display data is referred to as a thumbnail image in the description, and the two-dimensional coordinate system is referred to as a display coordinate system in the description. The display coordinate system is a two-dimensional Cartesian coordinate system. A display region for the display data is referred to as a viewport.

Although the case in which a plurality of images are arranged and displayed in the global coordinate system is illustrated herein, a single image may be arranged and displayed in the global coordinate system.

The thumbnail image is an image obtained by reducing the original image in size.

A first embodiment will be described.

Figure 4:
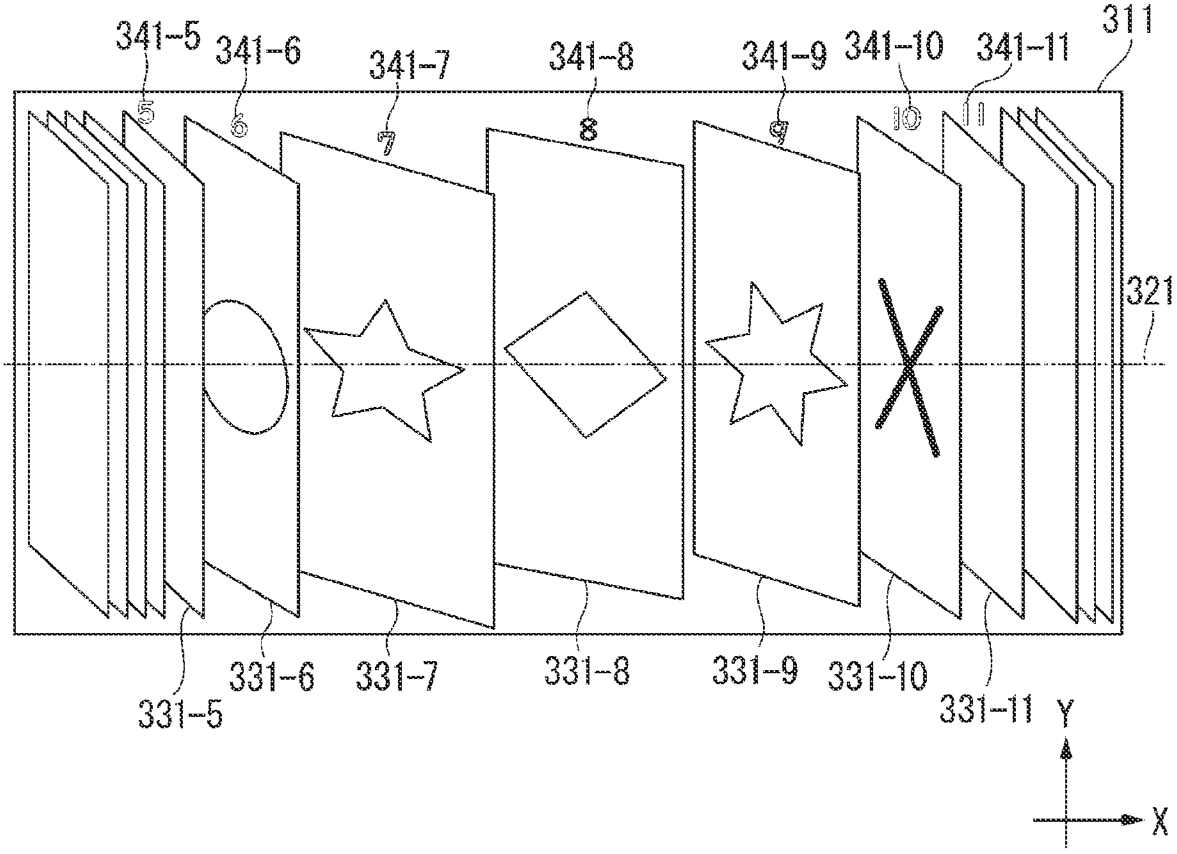
FIG. 4 is a diagram illustrating an example how thumbnail images are displayed.

FIG. 4 is a diagram illustrating an example of how thumbnail images 331 are displayed according to the embodiment.

FIG. 4 illustrates a display coordinate system including an X axis and a Y axis.

Here, when the screen of the display unit 112 of the terminal device 12 is viewed from the front, the positive direction of the X axis is the right direction, the negative direction of the X axis is the left direction, the positive direction of the Y axis is the upward direction, and the negative direction of the Y axis is the downward direction. The display coordinate system may be in any arrangement with respect to the screen.

In FIG. 4, a plurality of the thumbnail images 331 are displayed side by side along a first axis 321 in a first region 311, which is a display region. In the first region 311, the plurality of thumbnail images 331 are arranged in ascending order of page numbers from the negative side toward the positive side of the X axis.

Here, the first axis 321 is a virtual axis and is not actually displayed, but may be displayed in another configuration example.

In FIG. 4, the first axis 321 is parallel to the X axis and passes through the midpoint in a direction parallel to the Y axis in the first region 311.

The first region 311 may be the entire region of the screen of the display unit 112, or may be a partial region of the screen of the display unit 112.

In FIG. 4, a thumbnail image of any i-th page, among the plurality of thumbnail images 331, is illustrated as an i-th thumbnail image 331-*i*. Here, i is an integer that is equal to or larger than 1 and equal to or smaller than P that is the maximum value corresponding to the number of the plurality of thumbnail images. A thumbnail image which is given a page number is referred to as a thumbnail image 331.

In FIG. 4, the first region 311 is a rectangular region defined by sides parallel to the X axis and sides parallel to the Y axis.

The first region 311 has the width along the sides parallel to the X axis being larger than the width along the sides parallel to the Y axis, but this should not be construed in a limiting sense.

In FIG. 4, the thumbnail images 331 are rectangular images.

The plurality of thumbnail images 331 may each be arranged with the width along the sides parallel to the Y axis being larger than the width along the sides parallel to the X axis, may be arranged in an orientation different from this, or may be arranged with the orientation changed.

The display control unit 131 sets an angle between the plane of the original image and a display plane to be small for a k-th thumbnail image 331-*k* that is the thumbnail image of a k-th page in the vicinity of the center in the direction along the first axis 321 in the first region 311. The display control unit 131 sets the angle between the plane of the original image and the display plane to be larger for a k+m-th thumbnail image 331-(k+m) or a k−m-th thumbnail image 331-(k−m) farther from the k-th thumbnail image 331-*k* in the vicinity of the center, where m represents a predetermined number of images between the relevant image and the k-th thumbnail image 331-*k* inclusive. This k is an integer not exceeding P, and m is an integer smaller than k. The display control unit 131 makes the thumbnail images 331 displayed at an equal interval, at sections the separation of which from the center exceeds the predetermined number of images m, in the direction along the first axis 321 in the first region 311. FIG. 4 illustrates a case in which k is 8 and m is 3.

Portions of the first region 311 farthest from the center along the first axis 321 are referred to as edges of a first display region 411. The edges correspond to the left and right sides of the first region 311.

Each i-th thumbnail image 331-*i* is displayed with an image of the corresponding page number added thereto as an additional image.

In FIG. 4, an image of the page number of the i-th thumbnail image 331-*i* is illustrated as an i-th page number image 341-*i*. A page number image which is given a page number is hereinafter referred to as a page number image 341.

In FIG. 4, an eighth thumbnail image 331-8 of the eighth page where k is 8 and an eighth page number image 341-8 are displayed in a portion in the vicinity of the center of the first region 311 in the direction parallel to the X axis. In the direction parallel to the X axis, a ninth thumbnail image 331-9 of a k+1-th page and a tenth thumbnail image 331-10 of a k+2-th page, with the larger page numbers than the eighth page, are displayed in the ascending order of the page numbers in the positive direction of the X axis from the portion in the vicinity of the center of the first region 311. Similarly, in the direction parallel to the X axis, a seventh thumbnail image 331-7 of a k−1-th page and a sixth thumbnail image 331-6 of a k−2-th page, with the smaller page numbers than the eighth page, are displayed in the descending order of the page numbers in the negative direction of the X axis from the portion in the vicinity of the center of the first region 311.

In FIG. 4, some of the plurality of i-th thumbnail images 331-*i* and some of the i-th page number images 341-*i* are denoted by reference numerals for simplification of illustration.

The display control unit 131 adjusts the arrangement of the i-th page number image 341-*i* according to the arrangement of the i-th thumbnail image 331-*i*, in the local coordinate system of the i-th thumbnail image 331-*i*. The display control unit 131 generates display data including the i-th thumbnail image 331-*i* and the i-th page number image 341-*i*, for the display coordinate system.

The display control unit 131 displays the i-th page number image 341-*i* to be arranged on the positive side of the i-th thumbnail image 331-*i* of the i-th page along the Y axis.

The display control unit 131 displays the i-th page number image 341-*i* to be arranged within the first region 311. The display control unit 131 displays the i-th page number image 341-*i* within the first region 311 without protruding from the boundary line of the first region 311 on the positive side of the Y axis. In FIG. 4, the boundary line is a line parallel to the X axis.

In another configuration example, the display control unit 131 may display the i-th page number image 341-*i* in a mode to be partially or entirely outside the first region 311.

The display control unit 131 adjusts a display density of the i-th page number image 341-*i* for each page.

Here, the density adjustment may be realized by adjusting the transparency. Specifically, a lower transparency corresponds to a higher density, and a higher transparency corresponds to a lower density.

The display control unit 131 performs adjustment to set a high density for the k-th page number image 341-*k* of the k-th thumbnail image 331-*k* in the vicinity of the center in the direction along the first axis 321 in the first region 311. On the other hand, the display control unit 131 performs adjustment to make the density sequentially decrease to a k+m-th page number image 341-(k+m) of a k+m-th thumbnail image 331-(k+m) or of a k-m-th page number image 341-(k−m) of a k-m-th thumbnail image 331-(k−m) that is separated by the predetermined number of images m from the center. The display control unit 131 sets the density to be 0% for the page number images 341 for the thumbnail images 331 at sections, the separation of which from the center exceeds the predetermined number of images, in the direction along the first axis 321 in the first region 311.

The display control unit 131 sets the density to be 100% for the k-th page number image 341-*k* of the k-th thumbnail image 331-*k* closest to the center in the direction along the first axis 321 in the first region 311. The display control unit 131 sets the density to be 50% for the k+m-th page number image 341-(k+m) and for the k-m-th page number image 341-(k−m) that correspond to pages separated by the predetermined number of images m from the center, and sets the density to change under a predetermined mode for page number images 341 for pages between the k-th page and the k+m-th page and between the k-th page and the k-m-th page. As such a mode of change in the density, a mode may be employed in which a difference in density between the page number images 341 is equal among the adjacent thumbnail images 331, or a mode may be employed in which a difference in density between the page number images 341 varies in a stepwise manner in accordance with the inclinations of the thumbnail images. The inclination may be an inclination in the local coordinate system or an inclination in the display coordinate system.

In FIG. 4, the eighth page number image 341-8 for the eighth page displayed in the vicinity of the center of the first region 311 in the direction parallel to the X axis is displayed with the density of 100%.

In the first region 311, the ninth page number image 341-9 for the ninth page is displayed with a density lower than 100%, and the display density of the page number image 341 for one of the page numbers adjacent to each other increases toward the positive side of the X axis. The density of the page number images 341 is 0% for the thumbnail images 331 displayed at an equal interval in a section in the vicinity of the end on the positive side of the X axis in the first region 311, and a P-th page number image 341-P is not displayed.

Similarly, in the first region 311, the seventh page number image 341-7 for the seventh page is displayed with a density lower than 100%, and the display density of the page number image 341 for one of the page numbers adjacent to each other increases toward the negative side of the X axis. The density of the page number images 341 is 0% for the thumbnail images 331 displayed at an equal interval in a section in the vicinity of the end on the negative side of the X axis in the first region 311, and a first page number image 341-1 is not displayed.

In FIG. 4, the density of the i-th page number image 341-*i* is schematically illustrated for convenience of illustration, and does not necessarily represent the actual density.

As described above, based on the display mode of each i-th thumbnail image 331-*i*, the display control unit 131 may change one or more of display modes such as the shape, size, orientation, density, arranged position, and a display color, for the i-th page number image 341-*i* corresponding to the i-th thumbnail image 331-*i*.

The display control unit 131 may set a noticeable color for the k-th page number image 341-*k* corresponding to the k-th thumbnail image 331-*k* displayed in the vicinity of the center of the first region 311 in the direction parallel to the X axis, and may set a less noticeable color for the i-th page number image 341-*i* corresponding to the i-th thumbnail image 331-*i* away from the vicinity of the center.

The display control unit 131 may adjust the inclination of the i-th page number image 341-*i* corresponding to each i-th thumbnail image 331-*i* based on the inclination of and a distance to the adjacent page of the i-th thumbnail image 331-*i*. The inclination and the distance may be an inclination and distance in the local coordinate system, or may be an inclination and distance in the display coordinate system.

In FIG. 4, the display control unit 131 arranges the i-th page number image 341-*i* corresponding to each i-th thumbnail image 331-*i* on the positive side of the Y axis with respect to the i-th thumbnail image 331-*i*, but this should not be construed in a limiting sense. The display control unit 131 may arrange the i-th page number image 341-*i* corresponding to each i-th thumbnail image 331-*i* on the negative side of the Y axis, the positive side of the X axis, or the negative side of the X axis, with respect to the i-th thumbnail image 331-*i*.

In FIG. 4, the display control unit 131 arranges the i-th page number image 341-*i* corresponding to each i-th thumbnail image 331-*i* outside the i-th thumbnail image 331-*i*, but this should not be construed in a limiting sense. The display control unit 131 may arrange the i-th page number image 341-*i* corresponding to each i-th thumbnail image 331-*i* inside the each i-th thumbnail image 331-*i*.

Any method may be used as a method by which the display control unit 131 determines the display mode of each i-th page number image 341-*i*.

The display control unit 131 may determine the display mode of the page number image 341 corresponding to each thumbnail image 331 based on the area of the portion of each thumbnail image 331 where no other thumbnail image 331 is overlapped from above, a ratio of an area where no other thumbnail image 331 is overlapped on each thumbnail image 331 to the total area of the thumbnail image 331, or the like.

When a plurality of thumbnail images 331 overlap each other, the display control unit 131 may determine the display mode of the page number image 341 corresponding to each thumbnail image 331 based on the visible region of the thumbnail image 331. The visible region is a region that is visible by the user.

FIG. 4 illustrates the case in which the sizes of the original images of the plurality of thumbnail images 331 displayed in the first region 311 are the same, but the original images may include original images of different sizes. In this case, for example, the display control unit 131 may display, in the first region 311, the thumbnail images 331 having different sizes based on the sizes of the respective original images, or may execute processing of, for example, uniformizing the widths of all the thumbnail images 331 in one of the direction parallel to the X axis and the direction parallel to the Y axis or both.

The first axis 321 is a straight line, but may be a line other than a straight line in another configuration example.

As the first axis 321, a line may be used that is curved to be more on the positive side of the Y axis than the direction parallel to the X axis at a portion more on the positive side of the X axis from the center position of the first region 311, and to be more on the positive side of the Y axis than the direction parallel to the X axis at a portion more on the negative side of the X axis from the center position of the first region 311. The first axis 321 may be a line the positive side and the negative side of the X axis of which from the center position of the first region 311 are symmetrical to each other, about the direction parallel to the X axis.

The display mode of the page number images 341 when the plurality of thumbnail images 331 are displayed in the first region 311 in a still state is described. As another configuration example, the control for the display mode for the still state may similarly be applied to a display mode for the page number images 341 in a moving state in which the plurality of thumbnail images 331 are displayed in a varying manner in the first region 311.

When the plurality of thumbnail images 331 are moved along the first axis 321 based on an instruction from the user, the display control unit 131 may adjust the display modes of the page number images 341 corresponding to the respective thumbnail images 331. As a result, the plurality of thumbnail images 331 include a thumbnail image 331 with a page number image 341 in a different display mode.

Here, the display positions of the thumbnail images 331 move, for example, when an operation of changing the page selected by the user is performed. The display positions of the thumbnail images 331 may be moved by scrolling.

As described above with reference to FIG. 4, when displaying the plurality of thumbnail images 331 and the page number images 341 identifying the respective thumbnail images 331 along the first axis 321 in the still state, the terminal device 12 displays one or more of the plurality of page number images 341 in a different display mode.

Regarding the page for which the i-th page number image 341-*i* is displayed, for the i-th thumbnail image 331-*i* the display position of which is closer to an edge of the display unit 112 in the first axis 321 than the display position of another adjacent thumbnail image 331 with a larger distance therebetween, the terminal device 12 sets the density of the i-th page number image 341-*i* to be lower than the density of the page number image of the other adjacent thumbnail image 331 with a larger difference between the densities.

Regarding the page for which the i-th page number image 341-*i* is displayed, when the display area of the i-th thumbnail image 331-*i* is larger than the display area of another adjacent thumbnail image 331, the terminal device 12 sets the density of the i-th page number image 341-*i* to be higher than the density of the page number image 341 of the other adjacent thumbnail image 331.

Regarding the page for which the i-th page number image 341-*i* is displayed, when the visible region of the i-th thumbnail image 331-*i* is larger than the visible region of another adjacent thumbnail image 331 in a case in which a plurality of thumbnail images 331 are displayed in an overlapping manner, the terminal device 12 sets the density of the i-th page number image 341-*i* to be higher than the density of the page number image 341 of the other adjacent thumbnail image 331.

When two or more thumbnail images 331 are scrolled along the first axis 321 resulting in a change in the positions of these thumbnail images 331, the terminal device 12 changes the density of the page number images 341 corresponding to these thumbnail images 331 in accordance with the positions of the thumbnail images 331.

When two or more thumbnail images 331 are moved along the first axis 321 based on an instruction from the user, the terminal device 12 changes the display mode of the page number images 341 corresponding to these thumbnail images 331 in accordance with the positions of the thumbnail images 331.

Figure 5:
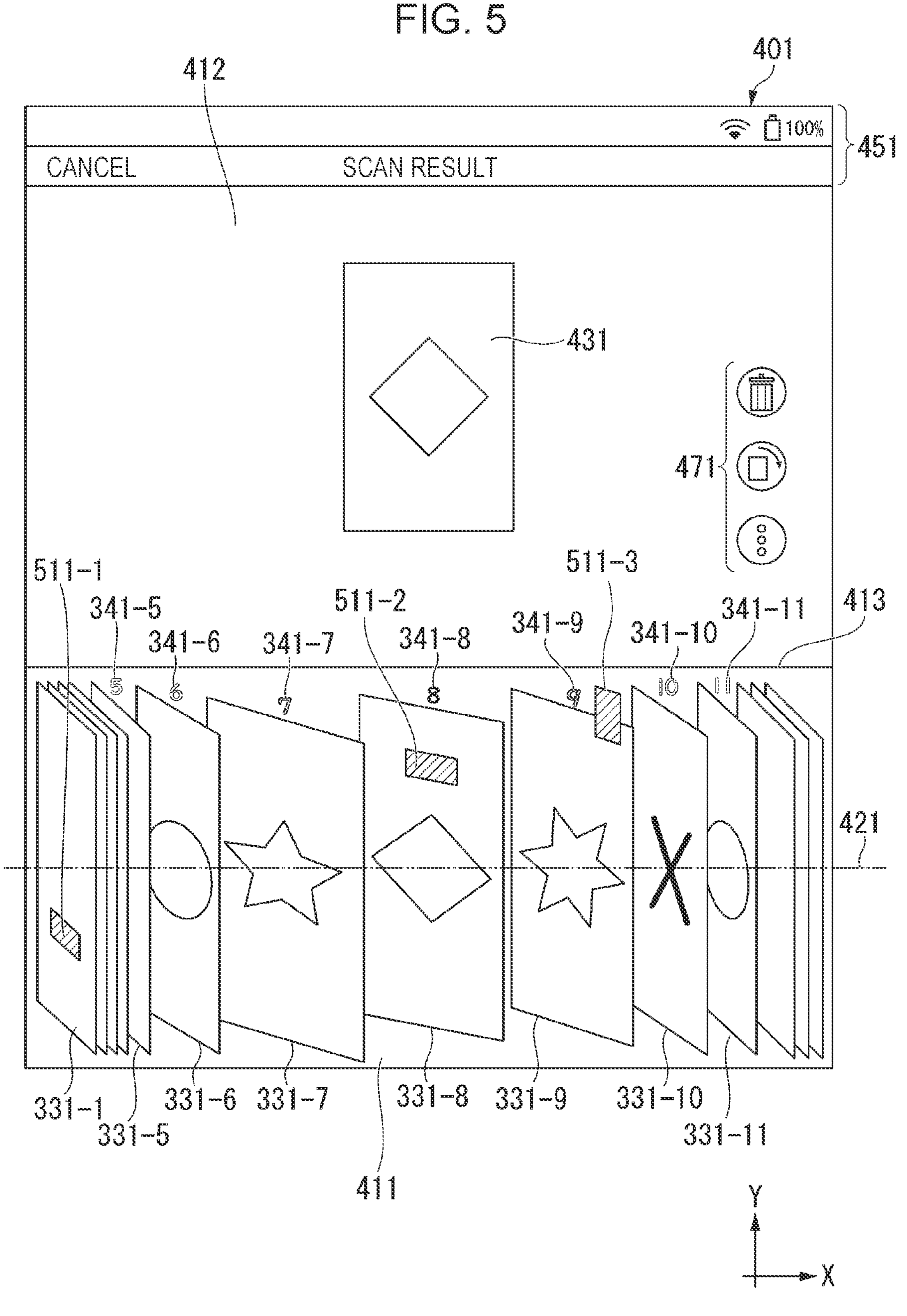
FIG. 5 is a diagram illustrating an example of a first display screen.

FIG. 5 is a diagram illustrating an example of a first display screen 401 according to an embodiment.

FIG. 5 illustrates display coordinates similar to those illustrated in FIG. 4.

The first display screen 401 is an example of a display screen displayed by the display unit 112 of the terminal device 12.

The display region of the first display screen 401 includes a first display region 411, a second display region 412, and a third display region 451. In the display region, the region other than the third display region 451 is divided into the first display region 411 and the second display region 412.

The display control unit 131 displays, in the third display region 451, the radio wave status of wireless communications and text information such as "cancel" operable by the user.

The display control unit 131 may or may not display the third display region 451.

The first display region 411 and the second display region 412 are each a rectangular region defined by sides parallel to the X axis and sides parallel to the Y axis.

The first display region 411 and the second display region 412 are illustrated to have the width along the sides parallel to the X axis being larger than the width along the sides parallel to the Y axis, but this should not be construed in a limiting sense.

In the direction parallel to the Y axis, the first display region 411 is arranged on the negative side of the Y axis, and the second display region 412 is arranged on the positive side of the Y axis. In the direction parallel to the X axis, the width along the sides of the first display region 411 and the width along the sides of the second display region 412 are the same. The side of the first display region 411 on the positive side of the Y axis and the side of the second display region 412 on the negative side of Y axis are arranged to overlap with each other. Thus, the first display region 411 and the second display region 412 together form a rectangular display region.

FIG. 5 illustrates a boundary line between the first display region 411 and the second display region 412 as a boundary axis 413. The boundary axis 413 may or may not be displayed.

The content displayed in the first display region 411 is substantially the same as the content displayed in the first region 311 in FIG. 4. Thus, in FIG. 5, the i-th thumbnail image 331-*i* and the i-th page number image 341-*i* are denoted by the same reference signs as those in FIG. 4. The boundary axis 413 illustrated in FIG. 5 corresponds to the boundary line of the first region 311 on the positive side of the Y axis illustrated in FIG. 4.

A first virtual axis 421 of the first display region 411 illustrated in FIG. 5 is a virtual axis similar to the first axis 321 illustrated in FIG. 4, and thus is not actually displayed.

The display content of the first display region 411 illustrated in FIG. 5 is different from that in FIG. 4 in that mark images are further displayed. In FIG. 5, the mark images are images representing sticky notes added to the respective i-th thumbnail images 331-*i*. The sticky notes are an example of a bookmark.

A first mark image 511-1 is added to a first thumbnail image 331-1 of the first page, a second mark image 511-2 is added to the eighth thumbnail image 331-8 of the eighth page, and a third mark image 511-3 is added to the ninth thumbnail image 331-9 of the ninth page.

The first mark image 511-1, the second mark image 511-2, and the third mark image 511-3 have the same density regardless of, for example, the display positions of the thumbnail images 331 to which the respective mark images are added in the first display region 411. The same density may be any value greater than 0%, such as 100% or 80%.

The mark images may be arranged within the thumbnail images 331 to which the respective mark images are added. Alternatively, part or entirety of each mark image may protrude from the thumbnail image 331 to which each mark image is added.

The display control unit 131 displays, in the second display region 412, an image corresponding to one thumbnail image 331 among the plurality of thumbnail images 331 displayed in the first display region 411. Such an image will be referred to as an intermediate image in the description. In FIG. 5, a first intermediate image 431 corresponding to the eighth thumbnail image 331-8 is displayed in the second display region 412.

The intermediate image is an enlarged image of the thumbnail image 331 corresponding to the intermediate image. The intermediate image may be reduced in size, may have the same size, or may be enlarged, as compared with the original image.

The thumbnail image 331 for which the intermediate image is displayed is the thumbnail image 331 in a state of being selected in the first display region 411, and is the k-th thumbnail image 331-*k* arranged in the vicinity of the center of the first display region 411 in the direction parallel to the X axis. This selection is implemented by an operation by the user on the first display region 411 or the second display region 412.

When a mark image is added to the thumbnail image 331 corresponding to the intermediate image displayed in the second display region 412, the display control unit 131 may display an image, corresponding to the mark image, while being added to the intermediate image or may or may not display the image corresponding to the mark image for the intermediate image.

FIG. 5 illustrates a case in which the display control unit 131 does not display an image corresponding to the second mark image 511-2 for the first intermediate image 431.

Upon detecting that the user has performed a predetermined operation on the terminal device 12, the display control unit 131 changes the image displayed in the second display region 412.

Upon detecting an operation performed by the user to swipe the first intermediate image 431 displayed in the second display region 412, the display control unit 131 displays in the second display region 412 an intermediate image of a page adjacent to the first intermediate image 431.

The display control unit 131 displays an intermediate image of a page with one page number incremented when the operation is an operation of moving a finger or the like from the positive side toward the negative side of the X axis, and displays an intermediate image of a page with one page number decremented when the operation is an operation of moving a finger or the like from the negative side toward the positive side of the X axis.

Upon detecting an operation performed by the user to touch a thumbnail image 331, among the plurality of thumbnail images 331 displayed in the first display region 411, different from the thumbnail image 331 currently selected, the display control unit 131 makes the touched thumbnail image 331 transition to the currently selected state, and displays in the second display region 412 the intermediate image corresponding to the touched thumbnail image 331.

In FIG. 5, the display control unit 131 displays a predetermined icon group 471 in the second display region 412. When an operation of, for example, tapping one icon in the icon group 471 is performed by the user using a finger or a touch pen, the display control unit 131 receives an instruction corresponding to the operation. The display control unit 131 may display any icon in one or both of the first display region 411 and the second display region 412.

As another configuration example, the display control unit 131 may display a predetermined menu on the display unit 112 when an operation of, for example, tapping a predetermined portion of the display unit 112 is performed by the user using a finger or a touch pen. When an operation of, for example, tapping a predetermined portion in the menu is performed by the user using a finger or a touch pen, the display control unit 131 receives an instruction corresponding to the operation.

Figure 6:
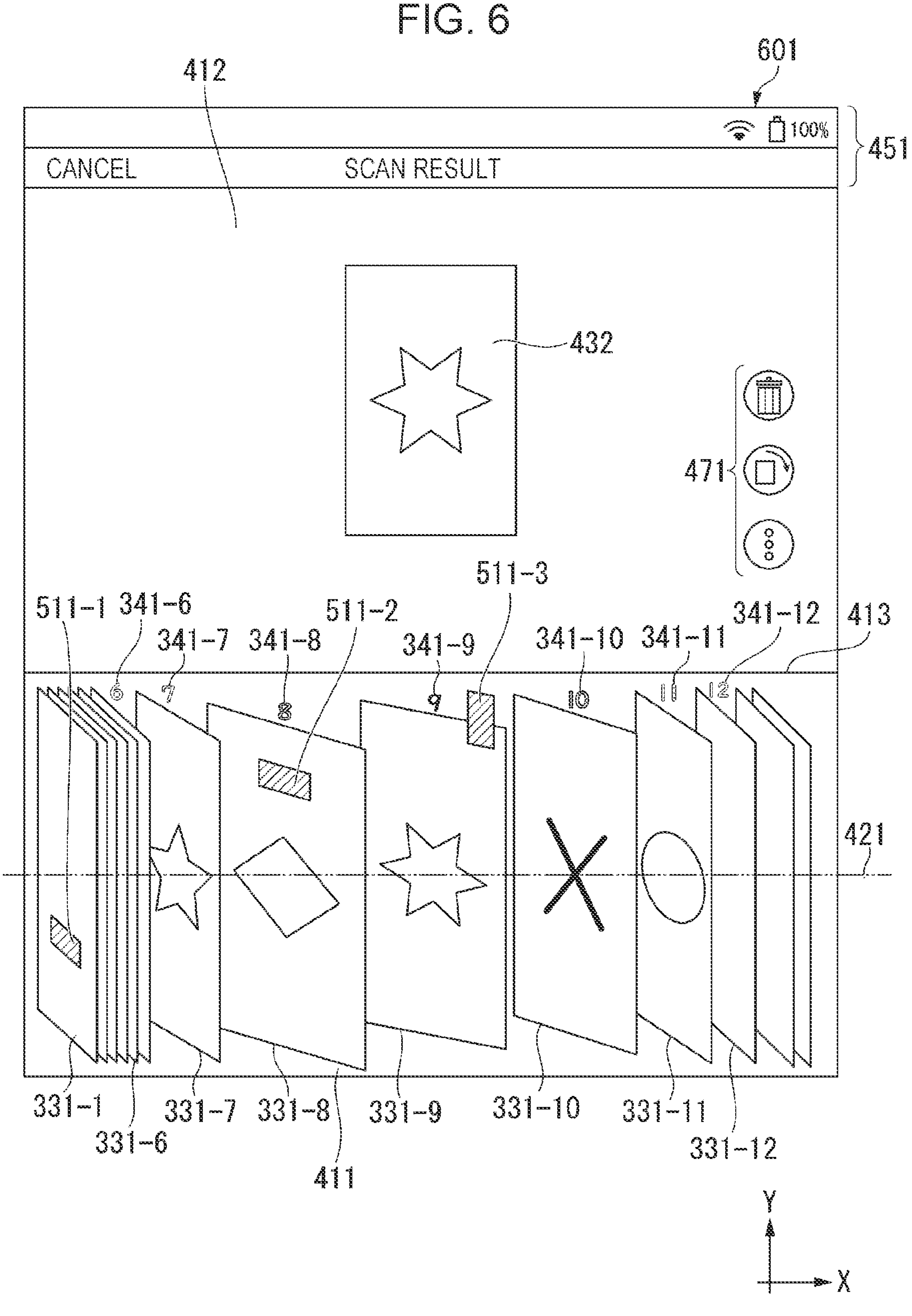
FIG. 6 is a diagram illustrating an example of a second display screen.

FIG. 6 is a diagram illustrating an example of a second display screen 601 according to the embodiment.

FIG. 6 illustrates display coordinates similar to those illustrated in FIG. 4.

FIG. 6 illustrates a display screen displayed when the display control unit 131 displays, in response to an operation of the user selecting the ninth thumbnail image 331-9 of the ninth page in FIG. 5, the ninth thumbnail image 331-9 in the vicinity of the center in the first display region 411 in the direction parallel to the X axis.

The display control unit 131 displays in the second display region 412 a second intermediate image 432 corresponding to the ninth thumbnail image 331-9.

FIG. 6 illustrates a case in which the display control unit 131 does not display an image corresponding to the third mark image 511-3 for the second intermediate image 432, but such an image may be added and displayed.

As described with reference to FIGS. 5 and 6, in the terminal device 12, the display unit 112 includes a region divided into the first display region 411 in which the i-th thumbnail images 331-*i* are displayed and the second display region 412 adjacent thereto on a second axis orthogonal to the first virtual axis 421, and the i-th page number images 341-*i* are displayed near the boundary between the first display region 411 and the second display region 412. In FIGS. 5 and 6, the second axis is an axis parallel to the Y axis, and may be the Y axis.

When the terminal device 12 adds mark images functioning as bookmarks to two or more thumbnail images 331, these mark images are the same. Although the case in which all the mark images are the same is described, a plurality of types of mark images may be used, and the shapes, sizes, colors, and the like of the mark images may be different among the types.

A second embodiment will be described.

Figure 7:
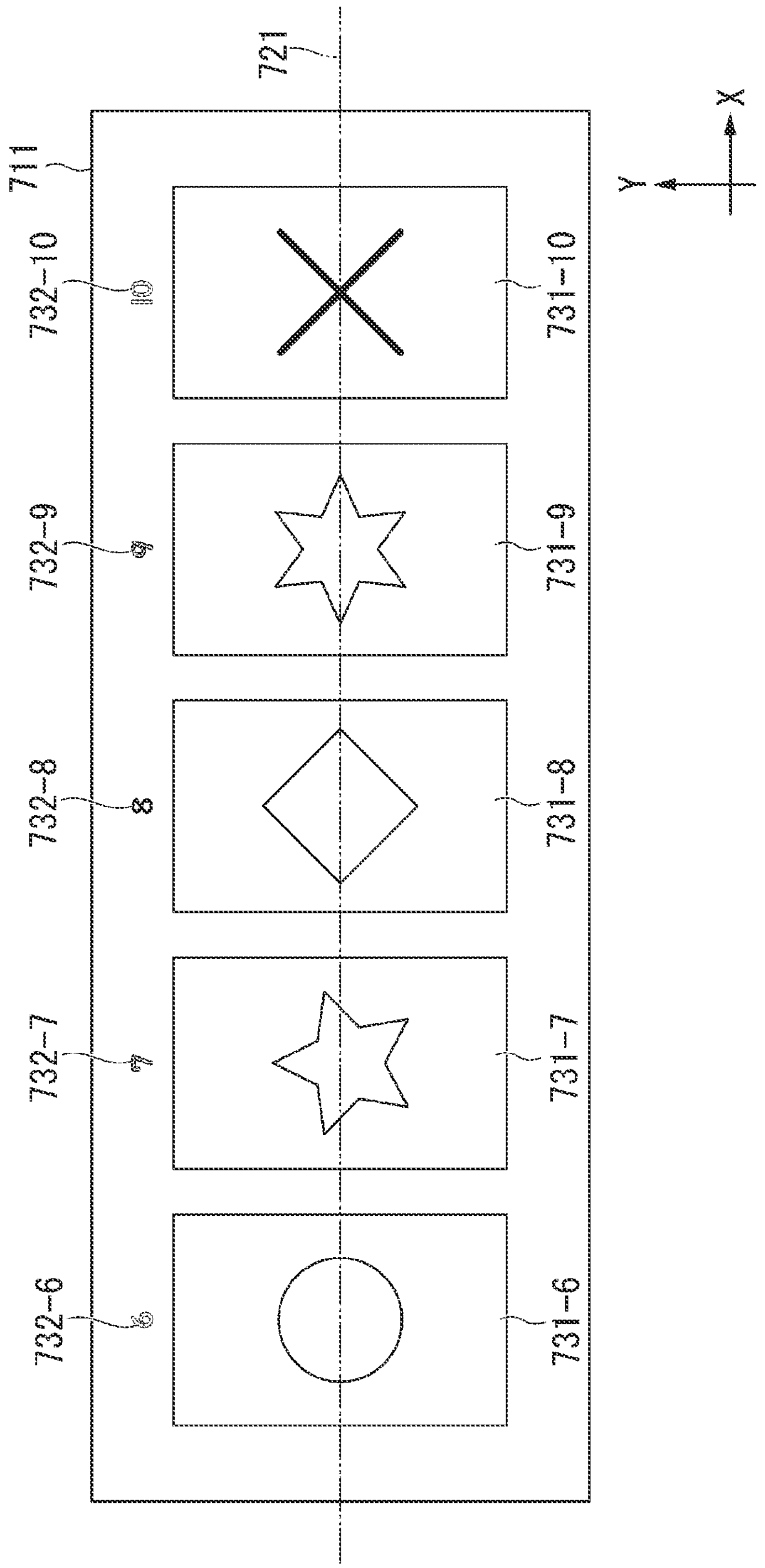
FIG. 7 is a diagram illustrating another example of how thumbnail images are displayed.

FIG. 7 is a diagram illustrating another example of how thumbnail images are displayed according to the embodiment.

FIG. 7 illustrates a display coordinate system similar to that illustrated in FIG. 4.

A second virtual axis 721 of a second region 711 illustrated in FIG. 7 is a virtual axis similar to the first axis 321 illustrated in FIG. 4, and thus is not actually displayed.

The second region 711 may be the entire region of the screen of the display unit 112, or may be a partial region of the screen of the display unit 112.

In FIG. 7, the display control unit 131 displays a plurality of thumbnail images 731 in the second region 711. The display control unit 131 displays the plurality of thumbnail images 731 as j-th thumbnail images 731-*j* in order of pages. Here, j is any integer that is equal to or larger than 1, and a maximum value P2 thereof represents the number of the plurality of thumbnail images 731. A thumbnail image unrelated to a page is referred to as a thumbnail image 731.

The display control unit 131 displays a j-th page number image 732-*j* which is an image of a page number corresponding to each of the j-th thumbnail images 731-*j* in the second region 711.

FIG. 7 is different from FIGS. 4 to 6 in that the display control unit 131 arranges all the j-th thumbnail images 731-*j* to have planes of their original images being parallel to the display plane. In FIG. 7, all the j-th thumbnail images 731-*j* are displayed to have their original images viewed in front view, without taking the display size into consideration.

FIG. 7 is different from FIGS. 4 to 6 in that the display control unit 131 displays the plurality of thumbnail images 731 side by side along the second virtual axis 721, in a mode without making some of the plurality of thumbnail images 731 overlap with the adjacent thumbnail images 731.

In FIG. 7, the display control unit 131 displays five thumbnail images 731 that are a sixth thumbnail image 731-6 of the sixth page to a tenth thumbnail image 731-10 of the tenth page.

The number of j-th thumbnail images 731-*j* displayed in the second region 711 as illustrated in FIG. 7 may be P2 that is the maximum number of thumbnail images 731, as in FIGS. 4 to 6. In such a case, the thumbnail images 731 may be reduced in size and displayed according to the number of thumbnail images 731. When the thumbnail images are reduced in size, the corresponding page number images 732 may also be reduced in size and displayed. A page number image unrelated to a page is referred to as a page number image 732.

As in FIG. 4, the plurality of page number images 732 are displayed under different display modes depending on the display positions of the corresponding thumbnail images 731. In FIG. 7, the density of an eighth page number image 732-8 corresponding to an eighth thumbnail image 731-8 arranged substantially at the center of the second region 711 is 100%, and the densities of a seventh page number image 732-7 corresponding to a seventh thumbnail image 731-7 and a ninth page number image 732-9 corresponding to a ninth thumbnail image 731-9, adjacent to the eighth thumbnail image 731-8, are lower than the density of the eighth page number image 732-8. Thus, the visibility can be improved without displaying too many display images in the second region 711.

In FIG. 7, the plurality of thumbnail images 731 displayed have no overlapping portion, but as another example, the display control unit 131 may display some or all of the thumbnail images 731 in a mode of making them overlap with other thumbnail images 731.

As described above, when displaying the plurality of thumbnail images 331, 731 on the display unit 112, the terminal device 12 of the information processing system 1 may add additional images such as page numbers in different display modes, to improve the visibility without making the amount of information on the display image excessive.

When the terminal device 12 displays a large number of thumbnail images such as 100 thumbnail images with the page number images 341 displayed above the thumbnail images 331 of all the pages, some or all of these large number of page number images 341 are displayed while overlapping each other. When this happens, the visibility of the page number images 341 may be largely compromised.

In view of this, the terminal device 12 displays the page number images 341 for the thumbnail images 331 of some of the pages to limit the amount of information on the display image in the display region. Thus, the visibility and identifiability of the page number images 341 for the plurality of thumbnail images 331 displayed in a still state can be improved.

By adjusting the display modes of the page number images 341 displayed above the respective thumbnail images 331, the terminal device 12 can display these page number images 341 without overlapping when the thumbnail images 331 of two or more pages are arranged to be slanted with respect to the first axis 321 and to overlap one another.

The terminal device 12 makes the page number image 341 corresponding to the thumbnail image 331 in the vicinity of the center completely opaque, and makes the page number images 341 corresponding to the thumbnail images 331 arranged at equal intervals near the left and right edges completely transparent. As a result, even when there are a large number of pages, the user can see the page number images 341 of a required part as being well organized.

The terminal device 12 displays the mark images such as sticky notes in an opaque manner with the same density regardless of their display portions and the like. As a result, the terminal device 12 can selectively use an additional image with variable density and a mark image with no change in density.

Generally, a sticky note is added to each individual page, and thus would not be functional when it is transparent. On the other hand, even when page numbers for some pages are transparent, a page number can be estimated from a page number of a preceding or subsequent page.

Although the scanner function of the image processing apparatus 11 is described in the embodiments described above, the image processing apparatus 11 may have other functions. The image processing apparatus 11 may have a printing function. In such a case, the terminal device 12 controls printing performed by the image processing apparatus 11, receives data related to an image to be printed, and displays the data related to the image on the display unit 112.

The image processing apparatus 11 may have a plurality of functions such as the scanner function and the printing function, and may be a multifunctional peripheral.

In the above embodiments, the case in which the terminal device 12 is a mobile terminal device is described. Alternatively, the terminal device 12 may be various devices, such as a stationary device, having a screen such as a display.

The terminal device 12 may be referred to as a viewer or the like.

The image processing apparatus 11 may be a server apparatus or the like that provides data on an image stored in a database or the like, to the terminal device 12.

The data of the image may be data on an electronic book.

As the display region of the display unit 112 of the terminal device 12, one display region may be used, two display regions such as the first display region 411 and the second display region 412 may be used separately, or three or more display regions may be used separately.

When the terminal device 12 uses a plurality of display regions, the plurality of display regions may be arranged in any way. The plurality of display regions may be arranged left and right, may be arranged up and down, or may be arranged in other ways when the terminal device 12 is viewed in front view.

The position of the first display region 411 and the position of the second display region 412 may be reversed in the terminal device 12.

Although the case in which the terminal device 12 displays one first intermediate image 431 in the second display region 412 is described, two or more first intermediate images 431 may be displayed in the second display region 412.

Although the case in which the display control unit 131 of the terminal device 12 performs various types of display control is described, the image processing apparatus 11 may perform similar display control. The image processing apparatus 11 controls display on a control panel provided in the image processing apparatus 11 to perform displaying, an external display, a remote display, or the like.

Although the case in which the display control unit 131 generates the display data using the local coordinate system, the global coordinate system, and the display coordinate system is described, this should not be construed in a limiting sense, and the display control unit 131 may generate the display data using any method.

A configuration example related to the above embodiments will be described.

The terminal device 12 in the information processing system 1 according to the embodiments performs the following image display method.

An image display method includes displaying a first image and a second image on the display unit 112 and when the first image to which a first additional image identifying the first image is added and the second image to which a second additional image identifying the second image is added are displayed along the first axis 321 in the still state, the display mode is made different between the first additional image added to the first image and the second additional image added to the second image.

In FIG. 4, the eighth thumbnail image 331-8 of the eighth page and the eighth page number image 341-8 are respectively an example of the first image and the first additional image, and the ninth thumbnail image 331-9 of the ninth page and the ninth page number image 341-9 are respectively an example of the second image and the second additional image. Similarly, in FIG. 4, the two thumbnail images 331 with the page number images 341 in different display modes and the page number images 341 are an example of the first image and the first additional image and the second image and the second additional image. In FIG. 4, the first axis 321 is illustrated.

In FIG. 7, the j-th thumbnail image 731-*j* and the j-th page number image 732-*j* respectively correspond to the i-th thumbnail image 331-*i* and the i-th page number image 341-*i* in FIG. 4. In FIG. 7, the second virtual axis 721 is illustrated.

In the image display method, when the display position of the second image is closer to an edge of the display unit 112 on the first axis 321 than the display position of the first image is, the density of the second additional image is lower than the density of the first additional image. In FIG. 4, the display position of the ninth thumbnail image 331-9 is closer to an edge of the display unit 112 on the first axis 321 than the display position of the eighth thumbnail image 331-8 is. The density of the ninth page number image 341-9 is lower than the density of the eighth page number image 341-8.

FIG. 7 is similar to the example in FIG. 4.

A configuration of changing another display mode instead of density may be employed. As an example, the visibility may be changed by changing the color of each page number image 341. The color of a page number image 341 at substantially the center of the display region is set to a color with high visibility such as black or red, and the color of page number images near the edges of the display unit 112 is changed to a color with low visibility such as yellow. As another example, the sizes of the page number images 341 may be changed. The size of a page number image 341 at substantially the center of the display region is made larger than the size of adjacent page number images 341.

In the image display method, when a third image to which a third additional image identifying the third image is added is displayed at a display position closer to the edge of the display unit 112 on the first axis 321 than the second image is, the density of the third additional image is lower than the density of the second additional image.

In FIG. 4, the eighth thumbnail image 331-8 of the eighth page and the eighth page number image 341-8 are respectively an example of the first image and the first additional image, the ninth thumbnail image 331-9 of the ninth page and the ninth page number image 341-9 are respectively an example of the second image and the second additional image, and the tenth thumbnail image 331-10 of the tenth page and a tenth page number image 341-10 are respectively an example of the third image and the third additional image.

FIG. 7 is similar to the example in FIG. 4.

A configuration of changing another display mode instead of density may be employed.

In the image display method, when the display area of the first image is larger than the display area of the second image, the density of the first additional image is higher than the density of the second additional image.

In FIG. 4, the display area of the eighth thumbnail image 331-8 is larger than the display area of the ninth thumbnail image 331-9. The density of the eighth page number image 341-8 is higher than the density of the ninth page number image 341-9.

Another property related to the image may be used instead of the display area of the image.

A configuration of changing another display mode instead of density may be employed.

In the image display method, when the first image and the second image are displayed while being overlapped with a visible region of the first image being larger than a visible region of the second image, the density of the first additional image is higher than the density of the second additional image.

In FIG. 4, the seventh thumbnail image 331-7 and the sixth thumbnail image 331-6 are displayed while being overlapped, and the visible region of the seventh thumbnail image 331-7 is larger than the visible region of the sixth thumbnail image 331-6. The density of the seventh page number image 341-7 is higher than the density of the sixth page number image 341-6.

Another property related to the image may be used instead of the visible region of the image.

A configuration of changing another display mode instead of density may be employed.

In the image display method, the display unit 112 includes a region divided into a first display region in which the first image and the second image are displayed, and a second display region adjacent to the first display region on the second axis orthogonal to the first axis, and the first additional image and the second additional image are displayed close to a boundary between the first display region and the second display region.

In FIGS. 5 and 6, the first display region 411, the second display region 412, the first virtual axis, and the boundary axis 413 are illustrated. In FIGS. 5 and 6, the second axis is an axis parallel to the Y axis.

Another configuration may be used as the configuration of the display region.

In the image display method, when positions of the first image and the second image on the first axis are changed as a result of scrolling the first image and the second image along the first axis, the density of the first additional image and the density of the second additional image are changed.

In FIGS. 4 to 6, the plurality of thumbnail images 331 are scrolled along the first axis 321 or the first virtual axis 421. When the positions of the thumbnail images 331 are changed, the densities of the page number images 341 are changed.

A configuration in which no scrolling is performed may be employed.

A configuration of changing another display mode instead of density may be employed.

The first additional image and the second additional image are numbers.

In FIGS. 4 to 6, the additional images are page numbers. FIG. 7 is similar to FIGS. 4 to 6.

As the additional images, information other than numbers may be used. An example of such includes text information such as the titles of the thumbnail images 331, numerical values such as the date of creating the original image, and the like.

In the image display method, when mark images functioning as bookmarks are added to the first image and the second image, the density of a first mark image added to the first image and the density of a second mark image added to the second image are the same.

In FIGS. 5 and 6, the first mark image 511-1, the second mark image 511-2, and the third mark image 511-3 have the same shape and the same density.

The mark images added to the images may be included in the images, or part of the mark images may protrude from the images.

The mark images may or may not necessarily need to be used.

A configuration in which the first mark image and the second mark image are different may be employed.

In the image display method, when the first image and the second image are moved along the first axis based on an instruction from a user, the display mode is made different between the first additional image added to the first image and the second additional image added to the second image.

In FIGS. 4 to 6, when the i-th thumbnail images 331-*i* are not only in the still state but also are moved along the first axis 321 or the first virtual axis 421, the display mode of the page number images 341 may be different among pages.

FIG. 7 is similar to FIGS. 4 to 6.

A configuration in which the display mode is not made different between the first additional image and the second additional image when the first image and the second image are moved along the first axis 321 may be employed.

An image display device corresponding to the image display method may be provided.

An image display device includes: the display unit 112 that displays a first image and a second image; the input unit 111 that receives an input; and the display control unit 131 that, when the first image to which a first additional image identifying the first image is added and the second image to which a second additional image identifying the second image is added are displayed along the first axis 321 in the still state, makes a display mode different between the first additional image added to the first image and the second additional image added to the second image.

In FIG. 2, the terminal device 12 is an image display device. The terminal device 12 includes the display unit 112, the input unit 111, and the display control unit 131.

A display control program corresponding to the image display method may be provided.

A display control program is executed by a computer causing the display unit 112 to display a first image and a second image, and when the first image to which a first additional image identifying the first image is added and the second image to which a second additional image identifying the second image is added are displayed along the first axis 321 in the still state, makes a display mode different between the first additional image added to the first image and the second additional image added to the second image.

In FIG. 2, the computer included in the terminal device 12 executes the display control program.

The display control program for realizing the functions of any component in any apparatus such as the terminal device 12 or the image processing apparatus 11 described above may be recorded in a computer-readable recording medium, and a computer system may read and execute the program. The "computer system" referred to here includes an operating system or hardware such as a peripheral device. The "computer-readable recording medium" refers to a portable medium such as a flexible disk, a magneto-optical disk, a ROM, and a compact disc (CD)-ROM, or a storage device such as a hard disk built in a computer system. Furthermore, the "computer-readable recording medium" includes those that hold a program for a certain period of time, such as a volatile memory inside a computer system serving as a server or a client when the program is transmitted through a network such as the Internet or a communication line such as a telephone line. The volatile memory may be a RAM. The recording medium may be a non-transitory recording medium.

The program described above may be transmitted from a computer system in which the program is stored in a storage device or the like to another computer system through a transmission medium or by transmission waves in the transmission medium. Here, the "transmission medium" for transmitting the program means a medium having a function of transmitting information, including a network such as the Internet or a communication line such as a telephone line.

The program described above may be for realizing part of the functions described above. The program described above may be a so-called difference file that can realize the functions described above by a combination with a program already recorded in the computer system. The difference file may be referred to as a difference program.

The functions of any component in any apparatus such as the terminal device 12 or the image processing apparatus 11 described above may be realized by a processor. Each process in the embodiments may be realized by a processor that operates based on information such as a program and a computer-readable recording medium that stores information such as the program. The function of each unit of the processor may be realized by individual hardware, or the function of each unit may be realized by integrated hardware The processor may include hardware, and the hardware may include at least one of a circuit for processing digital signals and a circuit for processing analog signals. The processor may be configured by using one or a plurality of circuit devices mounted on a circuit board, or one or a plurality of circuit elements, or both. An integrated circuit (IC) or the like may be used as the circuit device, and a resistor, a capacitor, or the like may be used as the circuit element.

The processor may be, for example, a CPU. However, the processor is not limited to the CPU, and various processors such as a graphics processing unit (GPU), a digital signal processor (DSP), or the like may be used, for example. The processor may be a hardware circuit including an application-specific integrated circuit (ASIC). The processor may be configured by a plurality of CPUs, or may be configured by a hardware circuit including a plurality of ASICs. For example, the processor may be configured by a combination of a plurality of CPUs and a hardware circuit including a plurality of ASICs. The processor may include one or more of an amplifier circuit, a filter circuit, and the like for processing analog signals.

Although the embodiments have been described as above in detail with reference to the drawings, the specific configuration is not limited to these embodiments, and designs and the like within the scope not deviating from the gist of the present disclosure are included.

What is claimed is:

1. An image display method comprising:

displaying a first image and a second image on a display, which includes side regions where images are displayed at an equal interval and a center region where images are displayed at different intervals; and when the first image to which a first additional image identifying the first image is added and the second image to which a second additional image identifying the second image is added are displayed on the center region of the display along a first axis in a still state, making a display mode different between the first additional image added to the first image and the second additional image added to the second image, wherein the display mode comprises a density of the first additional image and a density of the second additional image, and when a display position of the second image is closer to an edge of the display on the first axis than a display position of the first image is, the density of the second additional image is lower than the density of the first additional image, and when mark images functioning as bookmarks are added to the first image and the second image, the mark images are opaque with a same density regardless of display positions within the side regions and a central region.

2. The image display method according to claim 1, wherein when a third image to which a third additional image identifying the third image is added is displayed at a display position closer to a side region of the display on the first axis than the second image is, a density of the third additional image is lower than the density of the second additional image.

3. The image display method according to claim 1, wherein the display mode is a density of the first additional image and a density of the second additional image, and when a display area of the first image is larger than a display area of the second image, the density of the first additional image is higher than the density of the second additional image.

4. The image display method according to claim 1, wherein the display mode is a density of the first additional image and a density of the second additional image, and when the first image and the second image are displayed while being overlapped with a visible region of the first image being larger than a visible region of the second image, the density of the first additional image is higher than the density of the second additional image.

5. The image display method according to claim 1, wherein the display includes a region divided into a first display region in which the first image and the second image are displayed and a second display region adjacent to the first display region on a second axis orthogonal to the first axis, and the first additional image and the second additional image are displayed close to a boundary between the first display region and the second display region.

6. The image display method according to claim 1, wherein when positions of the first image and the second image on the first axis are changed as a result of scrolling the first image and the second image along the first axis, a density of the first additional image and a density of the second additional image are changed.

7. The image display method according to claim 1, wherein the first additional image and the second additional image are numbers.

8. The image display method according to claim 1, wherein when the first image and the second image are moved along the first axis based on an instruction from a user, the display mode is made different between the first additional image added to the first image and the second additional image added to the second image.

9. An image display comprising:

a display displaying a first image and a second image and including side regions where images are displayed at an equal interval and a center region where images are displayed at different intervals;

a processor receiving an input; and a display controller, when the first image to which a first additional image identifying the first image is added and the second image to which a second additional image identifying the second image is added are displayed on the center region of the display along a first axis in a still state, making a display mode different between the first additional image added to the first image and the second additional image added to the second image, wherein the display mode comprises a density of the first additional image and a density of the second additional image, and when a display position of the second image is closer to an edge of the display on the first axis than a display position of the first image is, the density of the second additional image is lower than the density of the first additional image, and when mark images functioning as bookmarks are added to the first image and the second image, the mark images are opaque with a same density regardless of display positions within the side regions and a central region.

10. A non-transitory computer-readable storage medium storing a display control program executed by a computer causing a display to display a first image and a second image, the display control program comprising causing the computer to:

when the first image to which a first additional image identifying the first image is added and the second image to which a second additional image identifying the second image is added are displayed at a display position closer to a side region of the display along a first axis in a still state, make a display mode different between the first additional image added to the first image and the second additional image added to the second image, wherein the display mode comprises a density of the first additional image and a density of the second additional image, and when a display position of the second image is closer to an edge of the display on the first axis than a display position of the first image is, the density of the second additional image is lower than the density of the first additional image, and when mark images functioning as bookmarks are added to the first image and the second image, the mark images are opaque with a same density regardless of display positions within the side regions and a central region.

11. The non-transitory computer-readable storage medium according to claim 10, wherein when a third image to which a third additional image identifying the third image is added is displayed at a position closer to the edge of the display on the first axis than the second image is, a density of the third additional image is lower than the density of the second additional image.

12. The non-transitory computer-readable storage medium according to claim 10, wherein the display mode is a density of the first additional image and a density of the second additional image, and when a display area of the first image is larger than a display area of the second image, the density of the first additional image is higher than the density of the second additional image.

13. The non-transitory computer-readable storage medium according to claim 10, wherein the display mode is a density of the first additional image and a density of the second additional image, and when the first image and the second image are displayed while being overlapped with a visible region of the first image being larger than a visible region of the second image, the density of the first additional image is higher than the density of the second additional image.

14. The non-transitory computer-readable storage medium according to claim 10, wherein the display includes a region divided into a first display region in which the first image and the second image are displayed and a second display region adjacent to the first display region on a second axis orthogonal to the first axis, and the first additional image and the second additional image are displayed close to a boundary between the first display region and the second display region.

15. The non-transitory computer-readable storage medium according to claim 10, wherein when positions of the first image and the second image on the first axis are changed as a result of scrolling the first image and the second image along the first axis, the density of the first additional image and the density of the second additional image are changed.

16. The non-transitory computer-readable storage medium according to claim 10, wherein the first additional image and the second additional image are numbers.

* * * * *